Figure 1:
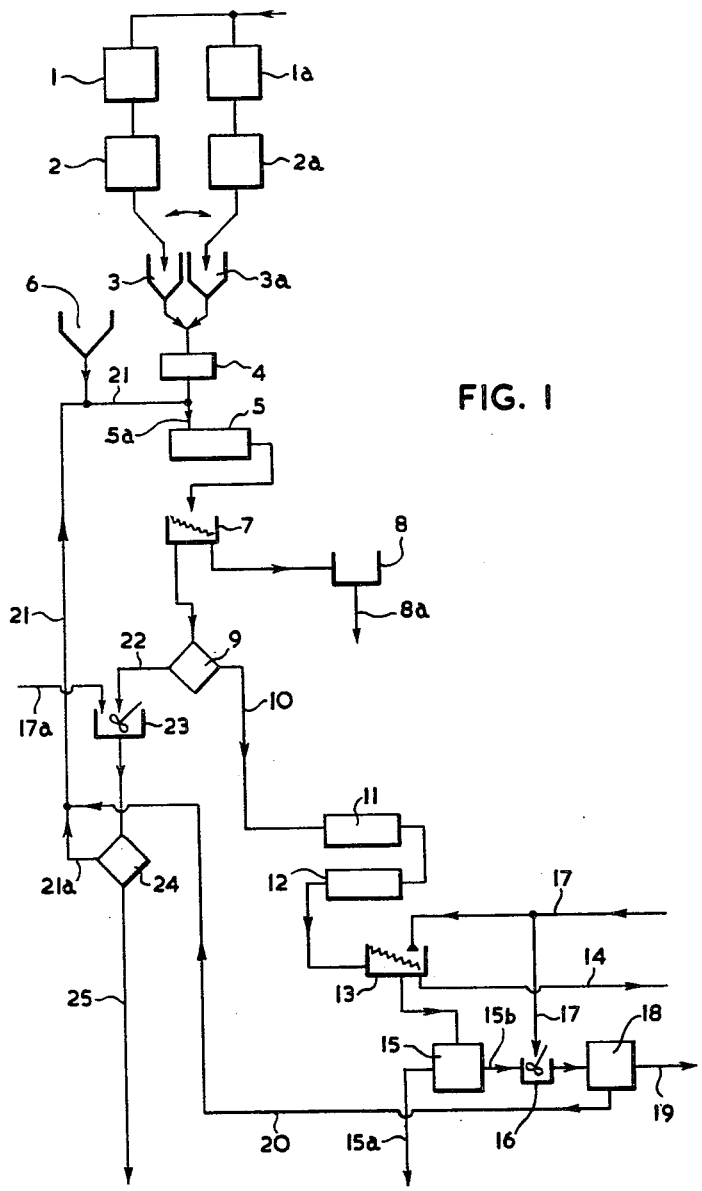

INVENTOR
M. W. COUTTS
BY: Fetherstonhaugh & Co
ATTORNEYS

Nov. 17, 1964　　　M. W. COUTTS　　　3,157,583
PROCESS FOR THE PRODUCTION OF FERMENTED MALT BEVERAGES
Filed Nov. 13, 1961　　　　　　　　　　　　2 Sheets-Sheet 2

INVENTOR
M. W. COUTTS
BY: *Fetherstonhaugh & Co*
ATTORNEYS

United States Patent Office 3,157,583
Patented Nov. 17, 1964

3,157,583
PROCESS FOR THE PRODUCTION OF FERMENTED MALT BEVERAGES
Morton William Coutts, 464 Remuera Road, Remuera, Auckland, New Zealand
Filed Nov. 13, 1961, Ser. No. 151,615
Claims priority, application New Zealand, Nov. 14, 1960, 127,825; Sept. 27, 1961, 130,336
2 Claims. (Cl. 195—14)

This invention relates to a method for the production of a malt extract and particularly to the production of an extract resembling what is conventionally known as malt extract which, in the main aspect of the invention, is boiled with hops and is fermented, clarified and carbonated to make beer.

According to known processes, germinated grain or malted grain which may have been subjected to a drying and curing process known as kilning is crushed and mixed with water to form a mash or slurry which is then subjected to various heat treatments to allow the protein and carbohydrate enzymes to liquefy their associated material, the starch being converted to the soluble form of dextrin, maltose, glucose, etc. and the proteins to a soluble form of amino acid and soluble protein, together with the other soluble extracts normally found in malt extract, the insoluble material being then separated from the soluble material and the substantially clear liquor then run either to a concentrator when malt extract is to be produced, or to a hop boiler when beer is to be produced.

In recent years, many improvements have been proposed for methods dealing with the separation of the insoluble material from the soluble material and, more especially, methods which enable this separation to take place in a continuous flow.

In all of these known processes, the separation of the insoluble material from the soluble material takes place after the starch has been converted to soluble sugar, the liquid containing the soluble material then being highly viscous with a high specific gravity, this condition of the solution making it very difficult to separate the insoluble material contained in it.

The only known method commercially practised in breweries makes use of either a straining vessel known as a lauter tun or a filter known as a mash filter, filtration taking place through the husk of the grain used.

According to the present invention, the starch is separated from a slurry of germinated grain, the substantially starch free slurry remaining then being heat processed to cause the enzymes to convert the protein, etc. contained in this slurry, the unconverted material being removed to give a clarified liquor which when added to the previously separated starch enzymatically converts the mixture to a clear sugary liquor.

If so desired, this sugary liquor after being heat treated to give a malty flavour may be run to a plurality of series connected continuous hop boiling and fermenting vessels and where the flow from the last of the series connected hop boilers is continuous, the flow between them may be intermittent.

Accordingly, one object of the invention is the separation and removal of the starch contained in a slurry of cold water and disintegrated germinated cereal, increasing the temperature of the residual slurry so that an enzymatic break-down of the various substances such as protein, gums, cellulose, etc. takes place and then removing the remaining insoluble material from the residual slurry by known means, the resultant clear liquor obtained still containing active starch conversion enzymes being returned to the flow of the substantially pure starch previously separated, this mixture after suitable heat treatment being converted to a clear soluble sugary extract similar to malt extract.

The extract, preferably after a short heat treatment to bring out a malty flavour, may then be used directly for the manufacture of beer or may be concentrated to a specific gravity of about 1,300 when it may be packed for transport. When a stronger malty flavour is desired, the substantially pure starch may be subjected to a heat treatment before being remixed with the clear liquor containing the active starch conversion enzymes.

A further object of the invention is to dry the separated starch by known means and to concentrate the clarified residual liquor containing soluble protein, active enzymes, sugars and gums, etc. to a specific gravity of about 1,300, or to a dried powder, both the dried starch and the concentrate being separately packed for transport and then at the place of usage, the dried starch is mixed with water to form a slurry, the concentrated protein, active enzymes, etc. being added and, after suitable heat treatment, the mixture becomes converted to a clear soluble liquor similar to malt extract.

It is a further object of the invention to use other sources of starch where it is more economical to do so and to mix with this starch the concentrated active enzymes, soluble protein, etc. so that the mixture will convert to a liquor similar to malt extract and if so required, only a proportion of the starch obtained from the germinated cereal which provided the active enzymes, soluble proteins, etc. may be used. A proportion of known types of brewers adjuncts may be added to the germinated slurry just after disintegration.

When a husk flavour is required in an extract for use specifically in the production of dry, pale types of beer, part of the screened husks are boiled and the extracted liquor returned to the system.

Broadly the invention comprises a method for the production of a clarified malt extract comprising the steps of separating the starch from a slurry made from water and a disintegrated starch bearing germinated grain containing active enzymes, subjecting the substantially starch free enzyme effluent to heat conditions to cause enzymes to become active, clarifying the said effluent, remixing said clarified enzyme bearing effluent with said separated starch and subjecting the mixture to a temperature increase to cause the enzymes in said effluent to convert said starch to soluble sugars to produce a clarified malt extract.

In describing the invention, reference will be made to the accompanying drawings in which:

FIGURE 1 diagrammatically shows the earlier steps taken in the carrying of the preferred process into effect.

Figure 2:
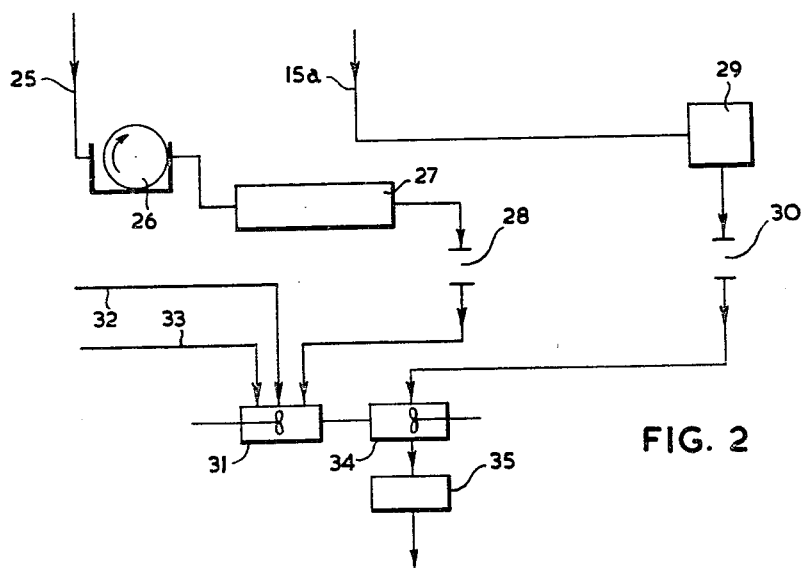
Figure 3:
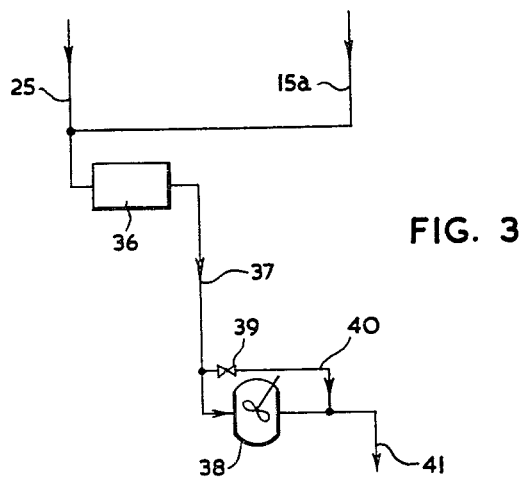

FIGURE 2 diagrammatically shows the preferred continued process steps taken carrying on from those of FIGURE 1; and FIGURE 3 diagrammatically shows modified process steps which may take the place of those shown in FIGURE 2 and carry on from FIGURE 1.

As the apparatus used is composed of units which in themselves are well known, no detailed description of the units will be necessary, but in describing the processes of the invention, brief descriptions of pieces of apparatus will be given where necessary.

The various process steps to be taken may be either carried out as separate batch processes or as continuous processes producing either an intermittent or a continuous flow, the end or final delivery however being required to be a continuous flow.

In carrying out the preferred process of the invention, with reference to FIGS. 1 and 2 of the drawings, a cereal, which for example may be barley, is passed through the various known processes used in the malting industry for the purpose of removing the bittering substances from the husks (for instance by lime washing) and also for inactivating adhering organisms which could bring about undesirable flavours in the resultant extract obtained, this being carried out in steeping tanks 1 and 1a which are similar in construction to those used in a conventional malting process, the barley being steeped and aerated in these tanks 1 and 1a so that germination takes place and is then transferred into similar tanks or into growth boxes 2 and 2a wherein germination is allowed to continue as in the methods used when malting barley, this point being reached between 3 and 5 days after the beginning of steeping when a rootlet system will have formed and the acrospire will have grown about half way up the back of the barley corn.

The growing barley is then dropped from the growth boxes 2 and 2a alternately to washing vessels 3 and 3a wherein it is washed with water and if desired, the rootlets removed.

The necessity for the alternate use of the steeping tanks 1 and 1a and the growth boxes 2 and 2a is to obtain their complete emptying for washing between the treatment of batches so as to prevent the gradual build-up of unwanted organisms similar to that achieved when a yeast culture is maintained in a continuous fermenting vessel with yeast free nutrient continually added and a yeast bearing effluent withdrawn.

After draining the water away from the washing vessels 3 and 3a, the growing barley left therein is removed alternately from said vessels 3 and 3a to form a continuous stream of barley passing to a disintegrator 4, the output of which is mixed with cold water to produce a slurry which passes to a holding vessel 5 which may comprise either a series of vessels (not shown) through which the flow is passed intermittently, or a single vessel 5 containing a helical screw which ensures that the contents move forward progressively.

At this stage in the passage of the barley from the disintegrator 4 to the holding vessel 5, brewers adjuncts as contained in a hopper 6 may be added, the hopper 6 being connected by pipe to the inlet 5a of the holding vessel 5.

The pH of the slurry may, if desired, be adjusted to known values which are favourable to cytase and protease enzyme activity, the enzymatic activity at this point being similar to that which takes place at the end of the growth period and at the beginning of the kilning period in normal barley malting practice, the temperature being about 95 degrees F. and the slurry held in the holding vessel 5 for between 2 and 24 hours according to the degree of soluble protein and aminoacids required.

Care requires to be taken to ensure that starch conversion is retarded as much as possible, especially where the diastatic enzymes are particularly active in the barley being treated and the activity of these starch converting enzymes may be retarded by a reduction in temperature or by a reduction in pH to below 5.2.

When the required degree of enzymatic conversion of the material other than starch has been achieved, the slurry delivered from the holding vessel 5 is subjected to a separating process by being passed through a vibrating screen 7 of known design which, while removing most of the insoluble protein fibrous and husk material, will allow the starch granules to pass through with the liquor in which is dissolved various components of the protein, gums, etc. contained in germinating barley, together with the active enzymes formed during the germinating process.

The separated husk and fibrous material is discharged from the screen 7 to receiving vessel 8 wherein the adhering starch is either removed by washing and returned by pipe 8a (and pipe lines which are not shown) to the inlet 5a of the holding vessel 5, or is increased in temperature to 150 degrees F. where, because of the active diastatic enzymes present, the starch will be converted to soluble sugar, and by a sparking process recovered as a sugar-containing liquor.

From the vibrating screen 7 the screened starch slurry passes to a centrifugal starch separator 9 of known design wherein the starch is separated in a substantially pure form while the effluent liquor which will contain a small amount of starch, active enzymes, the soluble and insoluble protein and gums, etc. leaves the starch separator 9 as a slurry which proceeds through pipe line 10 to a holding vessel 11 (which is similar to the holding vessel 5) through which the flow is caused to move progressively from the inlet to the outlet.

The insoluble protein, fibrous and husk material from the screen 7 may be passed by a pipe line (not shown) directly to the holding vessel 11, the temperature in this vessel 11 being raised to about 122 degrees F. for a period of between 10 and 60 minutes for the purpose of allowing protein and other conversion enzymes to become active.

The flow then proceeds to a further and similar holding vessel 12 wherein the temperature is still further raised to about 144 degrees F. and the pH is raised, if necessary, to above 5.1 but below a pH of 5.8 to ensure that the small amount of starch present is converted to soluble sugar.

The sparged and converted starch material recovered from the husk and fibrous material which did not pass through the screen 7 may be added from vessel 8 to the flow at the inlet of the vessel 11.

The flow from the vessel 12 passes to a vibrating screen 13 in which all fibrous and husk material is removed, the unscreenable material being sparged so that the washed residue from the screen 13 runs to waste through pipe 14, while the liquid slurry passing through the screen 13 runs to a clarifier 15 of known type, the clarified liquor containing all soluble material being delivered from one outlet 15a while the insoluble material obtained is delivered from another outlet 15b.

Where the extract obtained is to be boiled and fermented according to the process described in my New Zealand patent application No. 125,565/127,179, the degree of clarification in the clarifier 15 is not important in that a great part of the insoluble material present may be removed during fermentation in the boiling and fermenting process.

The insoluble material delivered from the clarifier 15 through the outlet 15b passes through a washing vessel 16 wherein it is mixed with water from a water supply pipe line 17, to then pass through a second clarifier 18, the washed insoluble protein, fibrous material, etc. being passed to waste through the outlet 19 and the liquor containing the extract adhering to the unwashed, fibrous material passed through the pipe 20 connected to pipe 21 which passes to the inlet 5a of the holding vessel 5.

The separated starch obtained from the outlet 22 of the separator 9 is, when necessary, passed through a washing apparatus 23 wherein it is diluted with water from water supply pipe 17a after which a further separation is effected by the separator 24 of known type, the starch flow in the delivery pipe 25 of this separator 24 now comprising a small amount of water and substantially pure starch, the wash water effluent being returned through the pipe 21a which is connected to pipe 21 passing to the inlet 5a of vessel 5, or to waste as desired.

The starch slurry flowing through the pipe 25 is then passed over a drum drier 26 (see FIG. 2) and through a drying oven 27 both of known design, after which the dried starch may be packed for transport at point 28.

When being passed through the oven 27, the starch may be subjected to increased heat according to the flavour required, varying degrees of malty flavour may be obtained by passing a controlled amount of the amino acid bearing clarified liquor from the clarifier 15 directly to the flow of starch slurry in the pipe 25.

The clear liquid flow from the clarifier 15 containing amino acids, soluble proteins and enzymes, etc. is run through the pipe 15a to a concentrator 29 of known design wherein the liquid is concentrated to a point where it is safe from spoilage organisms, or dried to a powder, both of these methods of concentration being achieved at temperatures which will not destroy the active enzymes as contained in the liquor being concentrated or dried to powder, the concentrate being then packed ready for transport at point 30.

At the place of usage, the dried starch as obtained from point 28 is put into a vessel 31 wherein, if so desired, brewer's adjuncts may be added through pipe 32, water from the pipe 33 also being added and the mixture converted to a slurry which is run to a further mixing vessel 34 wherein the soluble protein concentrate obtained from the point 30 is added.

The active enzymes contained in this extract upon its being raised to a temperature through 150 degrees F. and up to 170 degrees F. converts starch to soluble dextrin, maltose, glucose, etc.

This sugary mixture may then be run to vessel 35 where it may be used in the production of beer.

In the case of the alternative method in which the apparatus of FIG. 3 is used in place of that shown in FIG. 2, the pipe 15a through which the clarified liquor containing soluble material is flowing is connected to the pipe 25 through which there is the starch flow, such combined flow passing into a starch conversion holding stage vessel 36 which is fitted with a helical screw for moving the contents through progressively, the temperature in the vessel 36 being raised progressively through 145 degrees F. to 170 degrees F. and the holding time being about 60 minutes.

The outflow from this holding vessel 36 now contains in a substantially clear liquid the converted starch products, including dextrin, maltose, glucose, etc. together with amino acids, soluble protein, gums, etc. and such outflow is fed through pipe 37 to a boiling vessel 38 held under pressure so that temperatures of up to 225 degrees F. may be achieved in it, this boiling vessel 38 being provided with a by-pass valve 39 so that varying amounts of the flow may be by-passed through pipe 40.

The outflow 41 from the boiling vessel 38 to by-pass 40 may be fed directly to a continuous hop boiling vessel (not shown) where it is boiled with hops and, after the usual cooling treatment, fermented in a conventional batch system or in a known type of continuous fermenting system.

Alternatively, the flow from the outflow pipe line 41 may be run to a concentrating vessel where the water content of the extract is reduced to a point where the product exceeds a specific gravity of 1,300 so that it may be shipped for use in breweries or such other industries as baking or confectionery making.

What I claim as my invention is:

1. In a method for the production of a clarified malt extract, the steps of germinating barley to optimum point for enzyme formation, making a slurry of said germinated barley by disintegrating said germinated barley and adding water thereto, substantially separating the starch from the said slurry to give an effluent rich in barley enzymes and protein, said barley enzymes including protein conversion and diastatic enzymes, activating the said protein conversion enzymes in the substantially starch-free effluent, clarifying the said effluent to yield a clear effluent rich in starch conversion enzymes admixed with amino acids and soluble proteins, remixing the clarified effluent with said separated starch, and converting the starch to soluble sugars by enzymic action thereby obtaining a malt extract of soluble sugars admixed with amino acids and soluble protein.

2. In a method for the production of a clarified malt extract as claimed in claim 1 in which the said protein conversion enzymes are activated as aforesaid by subjecting the enzyme bearing effluent to a temperature of about 122° F. for a period of between 10 and 60 minutes.

References Cited by the Examiner

UNITED STATES PATENTS

| | | | |
|---|---|---|---|
| 1,237,724 | 8/17 | Steinemann | 99—53 |
| 1,920,461 | 8/33 | Clark | 99—51 |
| 2,222,306 | 11/40 | Atwood | 195—15 X |
| 2,557,032 | 6/51 | Kilander | 99—50 |
| 2,698,826 | 1/55 | Peltzer | 195—15 |

A. LOUIS MONACELL, *Primary Examiner.*
TOBIAS E. LEVOW, *Examiner.*